US008279541B2

(12) United States Patent
Henderson et al.

(10) Patent No.: US 8,279,541 B2
(45) Date of Patent: Oct. 2, 2012

(54) LENS ACTUATOR MODULE

(75) Inventors: David A. Henderson, Farmington, NY (US); Todd Haran, Bloomfield, NY (US); Matt Wrona, Fairport, NY (US); Qin Xu, West Henrietta, NY (US); Daniele Piazza, Rochester, NY (US)

(73) Assignee: New Scale Technologies, Victor, NY (US)

( * ) Notice: Subject to any disclaimer, the term of this patent is extended or adjusted under 35 U.S.C. 154(b) by 0 days.

(21) Appl. No.: 12/635,257

(22) Filed: Dec. 10, 2009

(65) Prior Publication Data

US 2011/0141584 A1  Jun. 16, 2011

(51) Int. Cl.
  *G02B 7/02* (2006.01)
(52) U.S. Cl. ........................................ 359/811
(58) Field of Classification Search .................. 359/811, 359/694–701, 704, 740, 819, 822–826
  See application file for complete search history.

(56) References Cited

U.S. PATENT DOCUMENTS

| 7,426,081 B2 | 9/2008 | Paik et al. |
| 7,590,342 B2 | 9/2009 | Wu et al. |
| 7,706,089 B2 * | 4/2010 | Koc et al. ...................... 359/824 |
| 7,839,586 B2 * | 11/2010 | Woo et al. ...................... 359/824 |
| 2008/0297923 A1 | 12/2008 | Koc et al. |
| 2009/0268318 A1 | 10/2009 | Woo et al. |
| 2011/0026150 A1 | 2/2011 | Shyu et al. |
| 2011/0026151 A1 | 2/2011 | Shyu et al. |

FOREIGN PATENT DOCUMENTS

| JP | 07-039177 | 2/1995 |
| JP | 11-264927 | 9/1999 |
| KR | 10-0799867 B1 | 1/2008 |

OTHER PUBLICATIONS

International Search Report for International Patent Application No. PCT/US2010/059611 (Aug. 19, 2011).

* cited by examiner

*Primary Examiner* — Ricky Mack
*Assistant Examiner* — Tuyen Tra
(74) *Attorney, Agent, or Firm* — LeClairRyan, a Professional Corporation

(57) ABSTRACT

A lens actuator module includes a lens assembly with an optical centerline and a clear aperture, a bearing guide integrated adjacent to the clear aperture with the centerline of motion substantially parallel to the optical centerline, a linear actuator with a preloaded frictional contact point that moves the lens along the centerline. The preload force is perpendicular to the optical centerline, constant and generated in-line with the contact point such that the preload force produces substantially zero additional friction in the bearing guide irrespective of the location along the optical centerline.

40 Claims, 12 Drawing Sheets

DETAIL D'   FIG. 4D

LENS ACTUATOR MODULE

FIELD

This invention relates to actuator modules that move a lens system with a clear aperture in a direction parallel to an optical centerline and methods thereof.

BACKGROUND

Digital cameras are becoming considerably popular electronic products in the world because of their adoption into nearly one billion mobile phones per year. Continuous pressure has been applied in the last ten years to reduce cost, complexity and size while at the same time increase image quality. These conflicting goals are in constant tension, but have produced remarkable cameras that fit in the smallest and thinnest mobile phones. Some examples of these innovations include: Complementary metal-oxide-semiconductor (CMOS) image sensors with ten times more pixels in the same image area; higher-quality yet lower-cost polymer and glass optics, ten times faster image capture electronics; and integrated lens actuation to automatically focus on both close-up (macro) and distant (infinity) objects. In a typical phone camera, the total track length of the optical system is less than 7 millimeters and movement required to focus from macro to infinity is less than 0.5 millimeters.

Auto focus (AF) technology is used in nearly one half of all phone cameras and the most common solution enabling the AF technology is a voice coil motor (VCM). A VCM auto focus camera suspends the lens in front of the image sensor with a flexure guide assembly. The flexure guide assembly holds the lens at fixed position as long as the external forces on the lens are constant. The VCM is a magnet and coil that surrounds the lens and generates a force in proportion to input current. The VCM force bends the flexure guide in a predictable manner such that input current to the coil approximately corresponds to lens position. One example of a VCM focusing lens module is described in U.S. Pat. No. 7,590,342, entitled, "Method and structure for suppressing response time of lens focusing structure," which is hereby incorporated by reference in its entirety.

Unfortunately, VCM focusing modules have limitations including high power to drive current in the coil, continuous current and power to hold a lens position, non-straight flexure movement that adds angular tilt between the lens and image plane, low strength to withstand drop testing, slow stepping movement and oscillations extend the focus time and delay the time to take a picture. In addition, lens angular tilt is a significant problem for cameras with a resolution greater than five mega pixels. For a five mega pixels camera, VCM lens tilt is typically 0.3 degrees which results in inconsistent focus over the full image. Slow stepping with oscillations is a particular problem for VCM because video capture requires continuous auto focus (CAF). The typical VCM settling time is 30 milliseconds and for CAF this slow and unstable motion results in continuous changes in the image focus and shifting of the image position.

Piezoelectric ultrasonic actuators (also referred to as piezo motors) are being commercialized that address the limitations of VCM modules. Piezo motors generate ultrasonic vibrations, with micrometer-scale amplitude, in a controlled manner. A piezo motor has a vibrating contact point that touches a moveable surface and can move this surface over a long distance with bi-directional control. The piezo motor's tiny and fast vibrations are controlled so as to add together when frictionally connected to a moveable surface. A critical requirement of piezo motors is an integrated preload force that creates the friction force at that contact point. This preload force must be created without generating significant friction outside of the contact point, otherwise no motion or unreliable and imprecise motion will result.

One example of a piezo motor is disclosed in U.S. patent application Ser. No. 12/228,943, entitled "Semi-resonant Driving Systems and Methods Thereof," which is hereby incorporated by reference in its entirety, in which a driving system including a structure and a vibration system is disclosed. The structure has at least one point to frictional couple to and drive a movable element in one of at least two directions. The structure also has at least two bending modes which each have a different resonant frequency. The vibration system applies two or more vibration signals which are at a vibration frequency to each of the bending modes of the structure. At the vibration frequency one of the bending modes of the structure is vibrating substantially at resonance and the other of the bending modes of the structure is vibrating at partial resonance. The vibration system adjusts a phase shift between the two or more applied vibration signals to control which one of the at least two directions the moveable element is moved.

Another example of a piezo motor is disclosed in United States Patent Application Publication No. 2008/0297923, entitled "Piezoelectric Actuator and Lens Driving device," which is hereby incorporated by reference in its entirety, in which a preload member applying an elastic force for elastically supporting the piezoelectric actuator against a lens barrel to keep the tip friction member and the friction member in contact with each other is disclosed.

Yet another example of a lens actuator module that integrates a piezo motor with friction contact driving force into a camera system is disclosed in United States Patent Application Publication No. 2009/0268318, entitled "Lens driving module," which is hereby incorporated by reference in its entirety.

Still yet another example of a lens actuator module that integrates a piezo motor with friction contact driving force into a camera system is disclosed in U.S. Pat. No. 7,426,081, entitled "Lens Transfer Device," which is hereby incorporated by reference in its entirety. This lens actuator module applies the preload force to the piezo motor contact point directly on a pin in the pin-bushing guide bearing. A requirement of this conventional example is the friction of the pin must be much less than the friction of the piezo motor. Since the preload force in this example equals the piezo motor preload force which also equals the pin-bushing guide reaction force, the coefficients of friction can be directly compared. The friction coefficient of the pin-bushing $\mu_{pin}$ must be significantly smaller than the friction coefficient at the piezo motor drive contact $\mu_{contact}$. However, the ratio $\mu_{pin}/\mu_{contact}$ must be minimized by using special low-friction materials, lubricants or rolling element bearings for the pin-bushing guide yet at the same time motor contact friction must be high. Since these two components are essentially co-located in the module, material selection and manufacturing challenges are significant. An exemplary performance metric for the lens actuator modules is the Safety Factor (SF). SF is the ratio $G_{max}/G_0$, where $G_{max}$ is the maximum lens weight that the lens actuator module can lift against gravity and $G_0$ is the actual lens weight. When $\mu_{pin}$ and $\mu_{contact}$ are nearly equal, the safety factor (SF) of the lens actuator module approaches 1. A safety factor greater than 4 is desirable because the lens actuator module will produce nearly the same speed irrespective of gravity orientation. Another related exemplary performance metric is the Speed Ratio defined as a ratio of speed with and speed against gravity, and is equal to the ratio (SF+1)/(SF−1). Thus, for example, when SF=4, the Speed Ratio is 5/3=1.66. Similarly, when the SF=1.5, the Speed Ratio=2.5/0.5=5.

Unfortunately, these existing systems and methods may still suffer from slow or low-precision focus over the full image resulting from lens angular tilt, in addition to oscillations and unstable motions during a continuous auto-focus mode of operation, and high sensitivity to gravity orientation due to a SF close to 1. Further, the existing systems may be impractical to manufacture at low cost in high volumes.

SUMMARY

A lens actuator module includes a linear actuator and a lens carriage frictionally coupled to the linear actuator at a contact point using a preload force at the contact point, such that the preload force is substantially constant, is in-line with the contact point, and is perpendicular to an axis of a linear actuator drive force from the linear actuator, the axis being substantially parallel to a centerline of the lens carriage.

A method for making a lens actuator module includes providing a linear actuator and frictionally coupling a lens carriage to the linear actuator at a contact point using a pre-load force, so that the pre-load force is substantially constant and is in-line with the contact point, the preload force being perpendicular to an axis of a linear actuator drive force from the linear actuator, the axis being substantially parallel to a centerline of the lens carriage. The method includes applying a driving force with the linear actuator while maintaining the in-line orientation of the preload force to move the lens carriage.

The exemplary lens actuator modules disclosed below provide a number of advantages including creating a higher performance lens actuator module that improves on all the limitations of VCM auto focus modules. The exemplary new lens actuator modules, for example, are suited for phone cameras with high resolution (e.g., greater than five mega pixels), a small optical track length (e.g., less than 7 mm), and a small total lens movement from infinity to macro (e.g., less than 0.5 mm). Another advantage of the exemplary lens actuator modules disclosed below is in optimizing the performance of a lens actuator module, with a linear friction motor and corresponding preload, to achieve a force efficiency greater than 50 percent, a force safety factor greater than four and a speed ratio less than 1.7. High efficiency, high safety factor and low speed ratio are achieved by generating the preload in-line with the drive contact point and optimizing the bearing guide properties. Various examples of the lens actuator modules disclosed below do not require careful engineering of the motor and bearing guide friction properties while still providing an efficient, fast, precise and robust lens actuator module. Furthermore, unlike conventional apparatuses, examples of the lens actuator modules disclosed below do not require a bearing guide that uses special and/or expensive low-friction materials or complicated rolling element bearings. Further still, mechanical and electrical assembly aspects of the exemplary lens actuator modules disclosed below are compatible with high-volume and low-cost manufacturing processes.

BRIEF DESCRIPTION OF THE DRAWINGS

FIG. 4D is a cross sectional view B-B and magnified view of the lens actuator module shown in FIG. 4B;

DETAILED DESCRIPTION

Figure 1A:
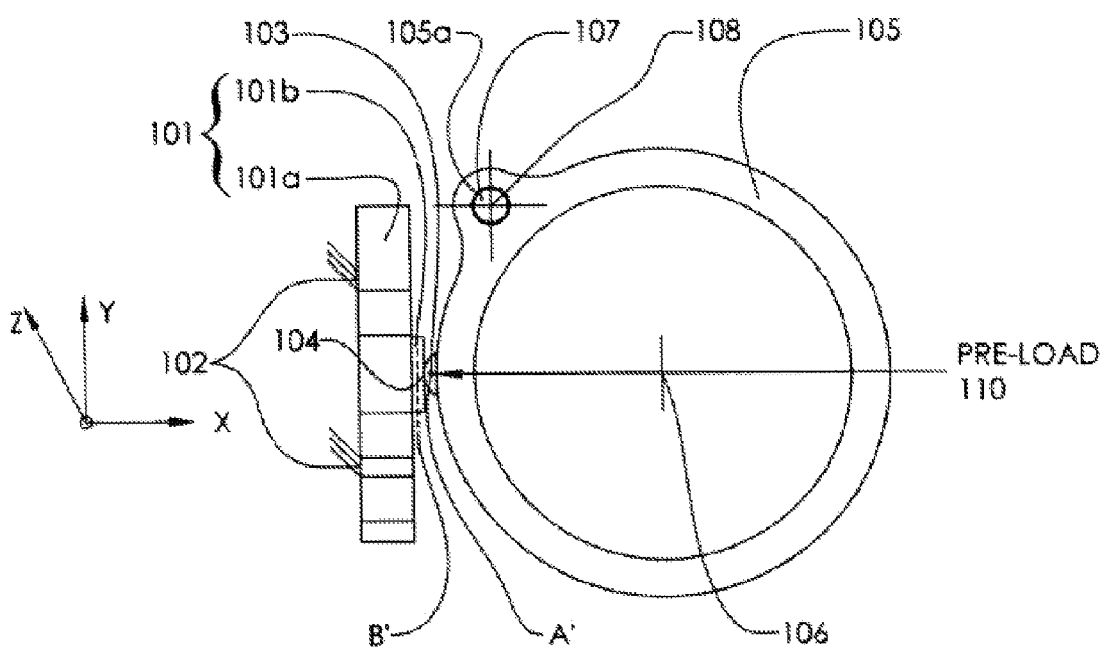
FIG. 1A is a top view of a lens actuator module showing various parameters for operation with a linear piezoelectric motor.
Figure 1B:
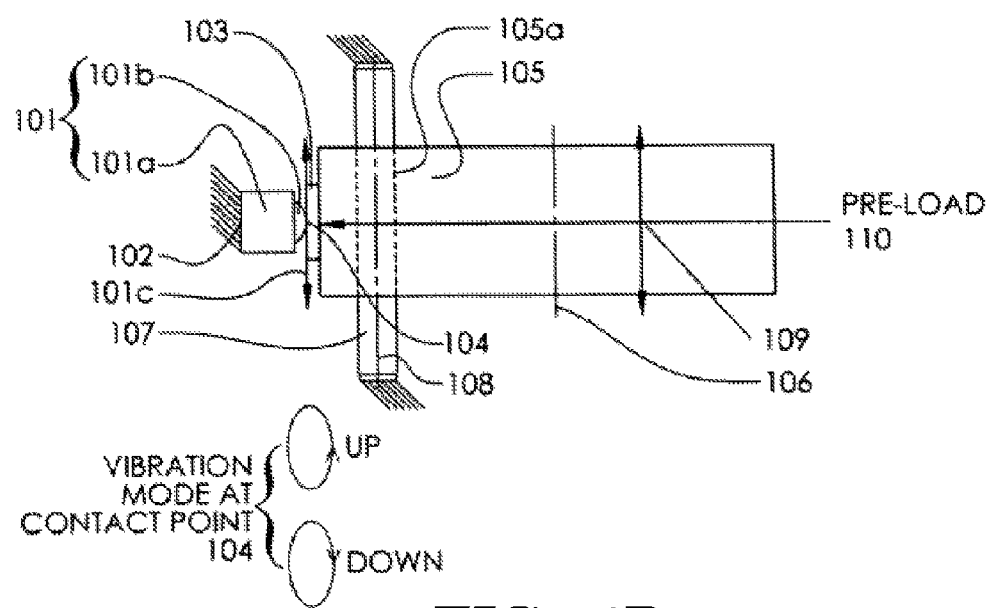
FIG. 1B is a side view of the lens actuator module shown in FIG. 1A showing various parameters for operation with a linear piezoelectric motor.

Referring to FIGS. 1A and 1B, diagrams of an exemplary lens actuator module 100 are shown. An ultrasonic piezoelectric motor 101 (interchangeably referred to herein as a piezo motor 101), which is a part of the lens actuator module 100, includes a vibrating piezoelectric ceramic body 101a (also referred to as ceramic rectangular beam 101a) and a motor contact member 101b with a cylindrical surface having a contact point 104, although other surface topologies may also be used. For example, the motor contact member 101b may be spherical and may contact a plane surface at the contact point 104. Similarly, for example, the cylindrical surface of the motor contact member 101b may contact a plane surface to form a contact line instead of the contact point 104. By way of example only, a vibration mode of the piezo motor 101 at contact point 104 is shown in FIG. 1B. For this piezo motor 101, the piezoelectric ceramic body 101a vibrates at a first bending mode frequency which produces two node points 102 (shown in FIG. 1A) where the vibration amplitude is the smallest. The structure and various forms of the piezo motor 101 including piezoelectric ceramic body 101a and the operation of piezoelectric ceramic body 101a, including various vibrating modes, are disclosed by way of example in U.S. patent application Ser. No. 12/228,943, filed Aug. 18, 2008, entitled, "Semi-Resonant Driving Systems and Methods Thereof," which is herein incorporated by reference, although other types and numbers of actuator devices can be used. The piezo motor 101 is supported by a fixed housing at at least one of the node points 102 to minimize vibration damping and maximize motor efficiency.

The lens actuator module 100 further comprises a lens carriage 105 that has a cylindrical opening that accepts a cylindrical lens assembly (not shown in FIGS. 1A and 1B) with an optical axis 106. Lens carriage 105 is displaceable along an axis 108 formed by a close fit between one or more bushings 105a formed in lens carriage 105 and a guide pin 107 with a diameter 'D'. Guide pin 107 is supported at its ends by a housing 111 (shown in FIG. 3A, for example) and guides carriage displacement along a direction 109. This combination or arrangement of bushings 105a and guide pin 107 is referred to as the pin-bushing guide herein. The pin-bushing guide supports the lens carriage 105 and is movable along axis 108 substantially parallel to optical axis 106 and also movable in rotation around axis 108, although other directions and/or axes and other guide systems may be used.

A frictional contact member 103 has a cylindrical surface and is secured to the lens carriage 105, although other surface topologies may also be used. By way of example only, contact members 103 can be of different shapes such as spherical, cylindrical, planar, convex, concave, or combinations thereof, to form contact point 104 or a contact line, depending on specific shapes of the contacting surfaces. An axis A' (in the Z-direction) of the cylindrical surface of frictional contact member 103 is orthogonal to an axis B' (in the V-direction) of the cylindrical surface of the motor contact member 101b and the cylindrical surfaces touch at the contact point 104. A preload force 110 exists between the motor contact member 101b and the frictional contact member 103. By way of example, the preload force 110 is shown in FIG. 1A and 1B being applied in a direction toward the piezo motor 101. The preload force 110 produces friction at the contact point 104. When the piezo motor 101 vibrates, the friction produces a motor drive force 101c that is orthogonal to the preload force 110. The motor drive force 101c causes the lens carriage 105 to move along axes 108 and 106 creating displacement in direction 109 (in the Z-direction) depending on the spatial arrangement and geometry of various components of lens actuator module 100.

Figure 2A:
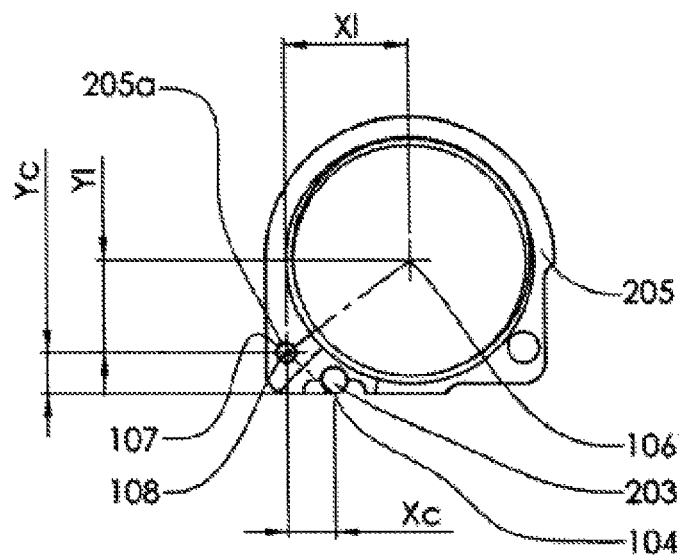
FIG. 2A is a top view of another lens actuator module illustrating components which affect the efficiency of the drive.
Figure 2B:
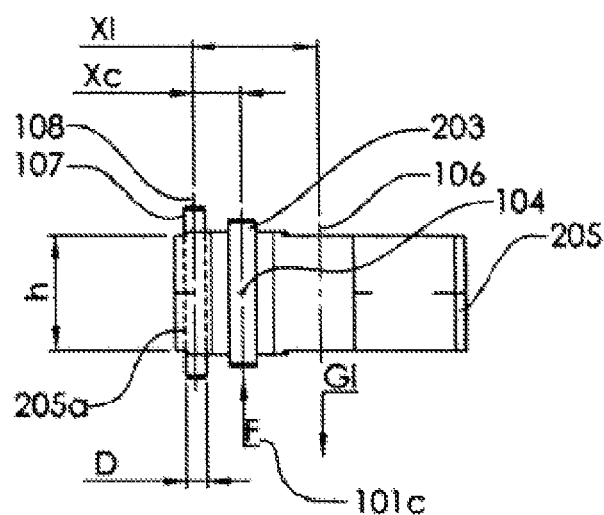
FIG. 2B is a side view of the lens actuator module shown in FIG. 2A illustrating components which affect the efficiency of the drive.

Referring to FIGS. 2A and 2B, another exemplary lens actuator module 200 is illustrated. A lens carriage 205, which is functionally same as the lens carriage 105 but has a different frictional contact member 203 larger and longer than the frictional contact member 103, is illustrated. In FIGS. 2A and 2B, a piezo motor force F, (shown as motor drive force 101c in FIG. 2B) drives the lens carriage 205 and frictional contact member 203 at contact point 104 along axis 108. The pin-bushing guide generates friction that resists the piezo motor force F (or, motor drive force 101c). By way of example only, if the weight of lens and lens carriage 205 is $G_1$ aligned with optical axis 106, which is the condition when gravity is also aligned with optical axis 106, force $F_0$ is the minimum piezo motor force F needed to move the lens carriage 205 for the most unfavorable case, which is against gravity, then the minimum piezo motor force $F_0$ is always larger than the weight, $G_1$. The following analysis shows that the minimum piezo motor force $F_0$ is proportional to weight $G_1$. A force efficiency $\epsilon$ is defined as the ratio ($G_1/F_0$) which is an exemplary performance metric of lens actuator modules 100 and 200. According to one example, the preload force 110 is substantially constant, is in-line with the contact point 104 thereby eliminating additional reaction forces and additional friction at the pin-bushing guide, and is perpendicular to optical axis 106. For this example, force $F_0$ can be calculated using the following equations:

$$F_0 = G_l + \frac{2\mu_{pin}}{h}\sqrt{(F_0 x_c - G_l x_l)^2 + (F_0 y_c + G_l y_l)^2} \quad (1)$$

or, $$F_0 = G_l \times \frac{(\tilde{h}^2 - x_c x_l + y_c y_l) + \sqrt{\tilde{h}^2(x_c^2 + y_c^2 + x_l^2 + y_l^2 - 2x_c x_l + 2y_c y_l) - (x_c y_l + y_c x_l)^2}}{\tilde{h}^2 - x_c^2 - y_c^2} \quad (2)$$

where $$\tilde{h} = \frac{h}{2\mu_{pin}}$$

where $\mu_{pin}$ is the coefficient of friction between the guide pin 107 and one of carriage bushings 205a, and h is the engagement length of carriage bushings 205a. The pin center corresponding with axis 108 is set as the origin, $X_c$, $Y_c$ are the Cartesian coordinates of the contact point 104, and $X_1$, $Y_1$ are the Cartesian coordinates of the center of mass lying along vector $G_1$ which also corresponds to optical axis 106. In this example, $X_c$, $Y_c$, $X_1$, and $Y_1$ are all positive values, although negative values may also be used. Further, by way of example only, the diameter of the guide pin 107 is approximately 0.5 mm, which is small compared to h and may be ignored for this analysis. It is to be noted that this exemplary analysis is independent of choice of co-ordinate systems or choice of origin, as known to those of ordinary skill in the art.

The predicted force efficiency $\epsilon$ of this lens actuator module is calculated to be:

$$\varepsilon = \frac{\tilde{h}^2 - x_c^2 - y_c^2}{(\tilde{h}^2 - x_c x_l + y_c y_l) + \sqrt{\tilde{h}^2(x_c^2 + y_c^2 + x_l^2 + y_l^2 - 2x_c x_l + 2y_c y_l) - (x_c y_l + y_c x_l)^2}}. \quad (3)$$

This equation shows several relationships for this exemplary analysis:
a) an exemplary way to increase the force efficiency $\epsilon$ is to increase $\tilde{h}$ which requires h to increase or $\mu_{pin}$ to decrease,
b) when $\tilde{h} \to \infty$, then $\epsilon \to 1$,
c) a smaller coefficient of friction $\mu_{pin}$ is beneficial but is not a critical requirement for achieving high value for force efficiency $\epsilon$ according to this example, and
d) in this example, the force efficiency $\epsilon$ is dependent upon a location of the contact point 104 and the location of the optical axis 106 with respect to the center of the guide pin 107 in a complex way. In general, smaller values of $X_c$, $Y_c$, $X_1$, and $Y_1$, the higher is the value of force efficiency $\epsilon$ (i.e., the smaller the distance between the guide pin 107 and optical axis 106, and between the guide pin 107 and contact point 104, the higher is the value of force efficiency $\epsilon$).

Figure 6A:
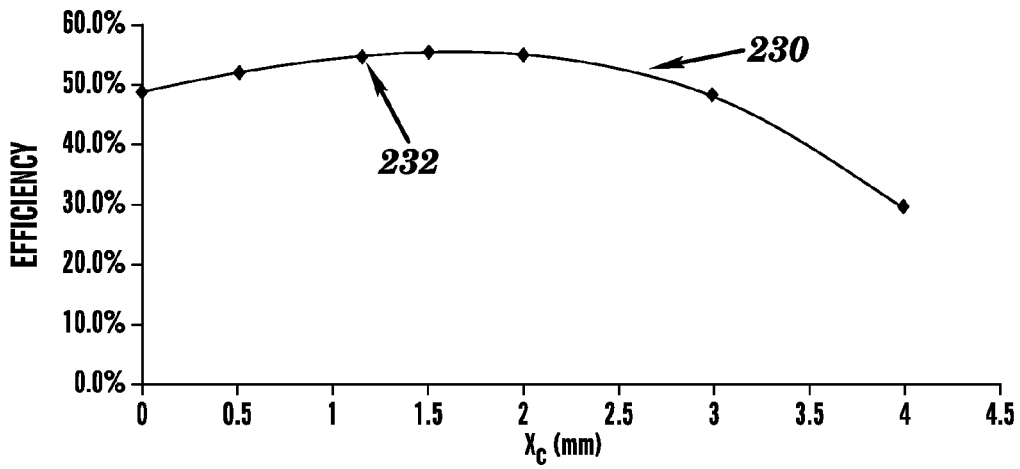
FIG. 6A at graph of efficiency vs. distance ($X_c$) of a contact point of piezo motor with a lens carriage.

Referring now to FIG. 6A, the force efficiency $\epsilon$ for a fixed configuration of $Y_c$, $X_1$, and $Y_1$ is plotted as plot 230. Plot 230 shows the maximum efficiency is achieved when $X_c \neq 0$. In this example shown for lens actuator module 200, force efficiency $\epsilon$ is substantially close to maximum efficiency (shown as data point 232), where: $\mu_{pin}=0.3$, $Y_c=1$ mm, $X_1=3$ mm, $Y_1=2.25$ mm, and h=3 mm, although other values can also be used, as will be apparent to one of ordinary skill in the art after reading this disclosure. In this example, the selected value for $X_c$ is 1.15 mm and the corresponding force efficiency $\epsilon$ is substantially close to a maximum of 55 percent. For the design parameters used in the exemplary lens actuator module 200, the minimum required piezo motor drive force $F_0$ is linearly proportional to lens weight $G_1$ with a slope of $1/\epsilon$, or the inverse of the force efficiency $\epsilon$. In this example, the minimum required preload force is $F_0/\mu_{contact}$ and is also proportional to lens weight $G_1$ with a slope of $1/(\epsilon\mu_{contact})$. A ratio between the actual preload force 110 and the minimum required preload force $F_0/\mu_{contact}$ is defined as a safety factor for lens actuator module 200.

To achieve millisecond-scale lens response time from lens actuator modules 100 and 200, micrometer-scale lens stepping resolution, and low sensitivity to gravity, the actual preload force 110 should be greater than the minimum required preload (i.e., a safety factor substantially greater than 1). Preload force 110 can not be made arbitrarily large because increasing preload force 110 can: increase the wear rate and reduce the lifetime of the contact surfaces, increase damping and reduce the vibration amplitude of the piezo motor 101, increase structural stresses and deflections, and increase orthogonal forces that increase pin-bushing friction that may make piezo motor 101 speed unstable toward the end limit(s) of the travel range. In this example for lens actuator module 200, the preload force 110 can range from 8 gf to 12 gf, which is practical to produce using low-cost and high-volume manufacturing processes.

Figure 6B:
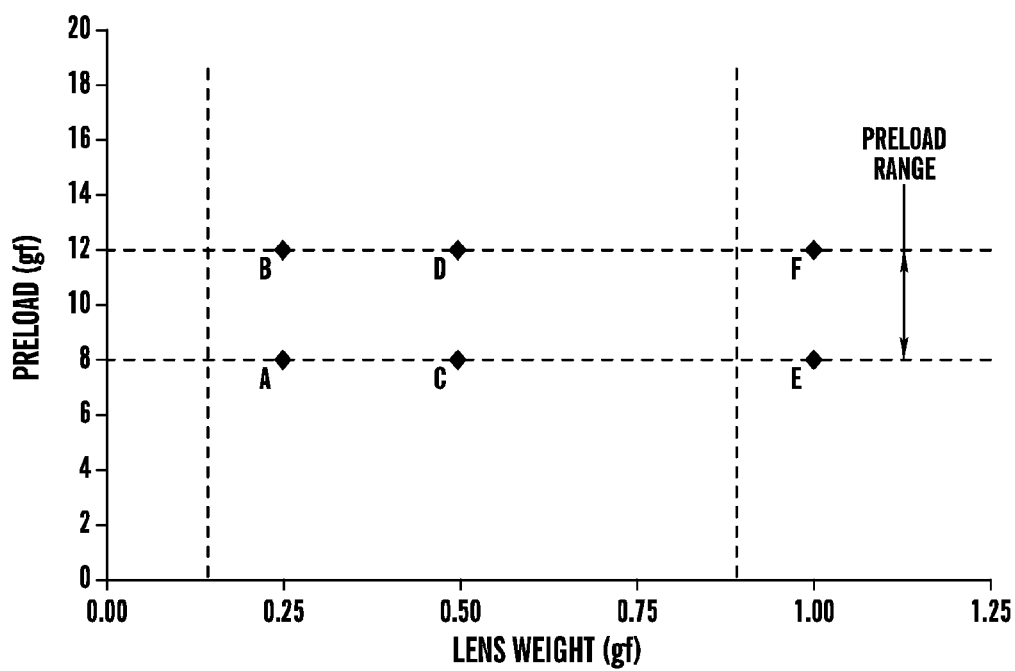
FIG. 6B is a graph of lens actuator module operating points for various preloads and lens weights.

Referring now to FIG. 6B, six exemplary combinations of preload force 110 and lens weight $G_1$, viz., A, B, C, D, E and F are shown. By way of example only, the lens weight $G_1$ varies from 0.25 gf (A and B) to 0.5 gf (C and D) and 1 gf (E and F). As an exemplary reference only, a typical lens weight in a mobile phone camera is 0.25 gf. The preload force 110 is set at the lowest value (8 gf) of the range for A, C, and E, and the preload force 110 is set at the highest value (12 gf) of the range for B, D, and F. Referring to Table I below, the calculated safety factors for the six cases A, B, C, D, E and F corresponding to linear actuator module 200 with $\mu_{contact}=\mu_{pin}=0.3$ are shown. For an example case $\mu_{contact}=\mu_{pin}=0.3$, which are exemplary conservative values that require no special materials or processing. The safety factors for these six cases are also shown in the Table I. Referring to Table I, according to one example aspect, a safety factor value greater than 4 can be used for operation of the lens actuator module 200 and is easily achieved for a real-world lens weight $G_1$ of 0.25 gf (e.g., cases A and B). A high safety factor insures fast, precise motion with a minimum variation in the forward and reverse velocities due to gravity. By way of example only, for a lens weight $G_1$ of 0.5 gf, the safety factor is still greater than 2.6. Further by way of example only, for a lens weight $G_1$ of 1 gf, the safety factor is still greater than 1, although other values of the safety factor may also be used depending upon various applications.

As noted above, the previously defined Safety Factor (SF) is also equal to the ratio $G_{max}/G_0$ where $G_{max}$ is the maximum lens weight that the module can lift against gravity and $G_0$ is the actual lens weight. This alternative definition can be useful, for example, for objectively comparing lens actuator module 200 designs with different internal designs but that are required to move the same lens weight. Achieving an SF greater than 4 is highly desirable because the module will produce nearly the same speed irrespective of gravity orientation. As also noted above, another related exemplary performance metric is the Speed Ratio defined as a ratio of speed with and speed against gravity. Speed ratio is equal to the ratio (SF+1)/(SF−1) when the piezo motor 101 speed is substantially linearly varying with driving force (also referred to as contact force or motor force). Thus, for example, when SF=4, the Speed Ratio is 5/3=1.66. Similarly, when the SF=1.5, the Speed Ratio=2.5/0.5=5.

TABLE I

| Case | Actual Lens Weight, $G_l$ (gf) | Actual Preload force 110 (gf) | Minimum Preload (To create $F_0$) (gf) | Actual Motor Force, F (gf) | Maximum Lens Weight, $G_{max}$ (gf) | Safety Factor | Speed Ratio |
|---|---|---|---|---|---|---|---|
| A | 0.25 | 8  | 1.53 | 2.4 | 1.31 | 5.23 | 1.47 |
| B | 0.25 | 12 | 1.53 | 3.6 | 1.96 | 7.84 | 1.30 |
| C | 0.50 | 8  | 3.06 | 2.4 | 1.31 | 2.61 | 2.24 |
| D | 0.50 | 12 | 3.06 | 3.6 | 1.96 | 3.92 | 1.68 |
| E | 1.00 | 8  | 6.12 | 2.4 | 1.31 | 1.31 | 7.45 |
| F | 1.00 | 12 | 6.12 | 3.6 | 1.96 | 1.96 | 3.08 |

The examples above illustrate some of the advantages of the present invention. For example, reliable, fast and precise lens motion is achieved using low cost materials and a simple pin-bushing guide. By way of example only, additional performance margin is substantially practical to realize by reducing the pin-bushing friction (reducing $\mu_{pin}$) to 0.2 and keeping the contact point friction $\mu_{contact}$ at 0.3.

According to one aspect, preload force 110 is in-line with the contact point 104, or lies on the same axis as contact point 104. For example, in lens actuator module 200 the magnetic preload force 110 is in-line and completely balanced by a reaction force at contact point 104. These balanced and cancelled forces do not create additional reaction forces on the pin-bushing guide and therefore, do not create additional friction or reduce the safety factor or increase the speed ratio.

Other examples of lens actuator modules 100 and 200 may not have the preload force 110 in-line with the contact point 104 and further, the preload force 110 and the opposing contact force at contact point 104 may not be the same. For these cases, the preload force 110 can produce additional moments and forces (also referred to as out-of-line forces and out-of-line moments) on the pin-bushing guide thereby generating additional frictional forces and significantly reducing the safety factor and increasing the speed ratio. By way of example only, the contact point 104 remains at $x_c$ relative to an origin defined as per equation (3) above but the preload point is no longer at $x_c$ but at $x_p$, where $x_p$ is a different value of coordinate point, and the origin remains at the pin-bushing centerline. For this case an upper limit of the force efficiency $\epsilon_{na}$ is approximately represented by the following relationship:

$$\varepsilon_{na} \approx \frac{\varepsilon}{1 + \mu\varepsilon\left|1 - \frac{x_p}{x_c}\right|\frac{F_p}{G_l}} \quad (4)$$

where $\epsilon$ is the force efficiency from equation (3) above, where the preload force 110 is equal to $F_p$ and is aligned with the contact point along the y axis. The drive efficiency is always reduced when the preload is not aligned with the contact point. Setting $\mu = \mu_{contact} = \mu pin = 0.3$, $F_p = 10$ gf, $G_1 = 0.25$ gf, and $\epsilon = 55\%$, if $x_p = 2x_c$, $\epsilon_{na} \approx 7.2\%$. Similarly, if $x_p = 0.5x_c$, $\epsilon_{na} \approx 12.8\%$. These examples show dramatic drops in drive efficiency and corresponding safety factor when the preload force 110 is not in-line (or, out-of-line) with the contact point.

Figure 3A:
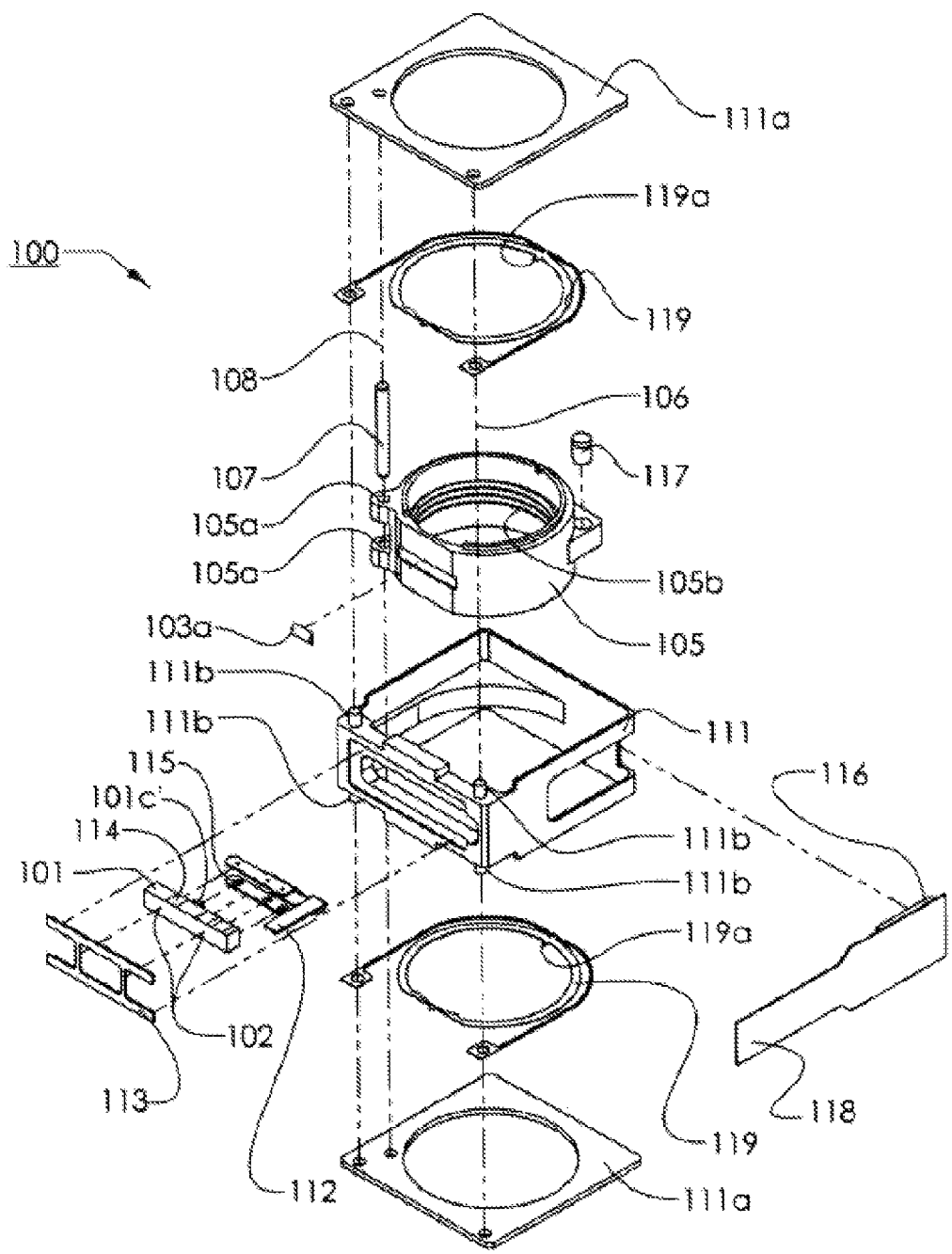
FIG. 3A is an exploded perspective view of the lens actuator module shown in FIGS. 1A and 1B.

Referring now to FIGS. 3A-3G, the lens actuator module 100 is shown. More specifically, FIG. 3A illustrates housing 111 and housing end plates 111a forming an external and stationary structure of lens actuator module 100. Lens carriage 105 fits inside housing 111 and has a cylindrical threaded opening 105b that accepts a threaded optical lens assembly that is not shown in FIG. 3A but has the optical axis 106. Lens carriage 105 is displaceable along axis 108 (also shown in FIG. 3B, for example) formed by the guide pin 107 that is fixed to the housing end plates 111a. Guide pin 107 fits inside bushings 105a with a small clearance typically less than 5 micrometers. Bushings 105a are part of lens carriage 105 and together with guide pin 107 form an arrangement referred to as the pin-bushing guide herein. The pin-bushing guide supports lens carriage 105 and the lens and moves in a linear direction along axis 108 and also rotates around axis 108, although other types of motion may also be supported by the pin-bushing guide. By way of example only, axis 108 is substantially parallel to optical axis 106.

Figure 3B:
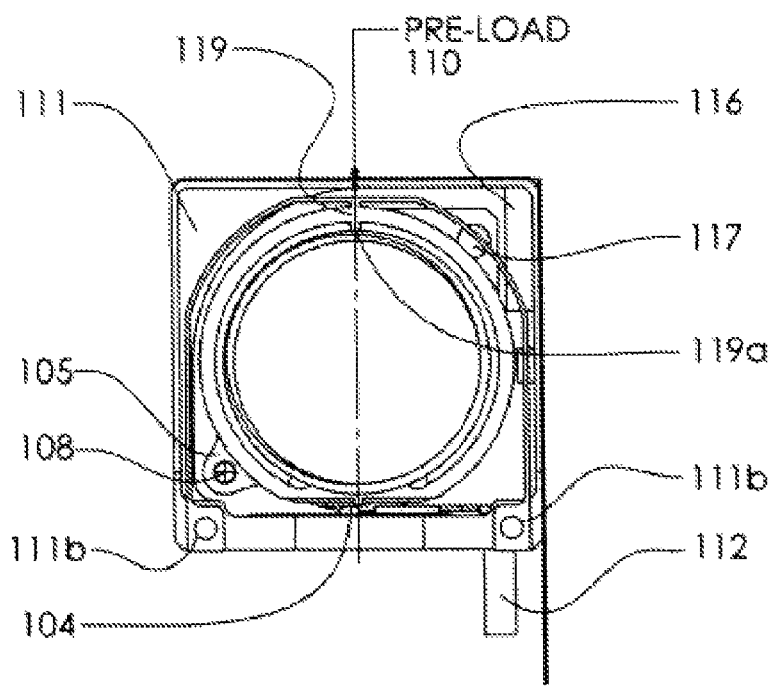
FIG. 3B is a top view of the lens actuator module shown in FIG. 3A.
Figure 3C:
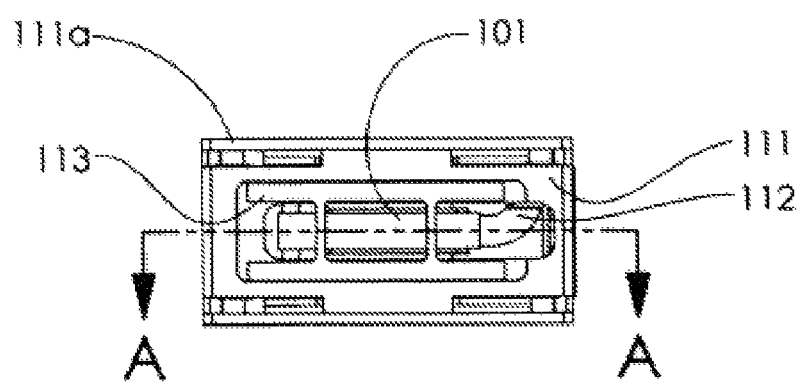
FIG. 3C is a side view of the lens actuator module shown in FIG. 3A.
Figure 3D:
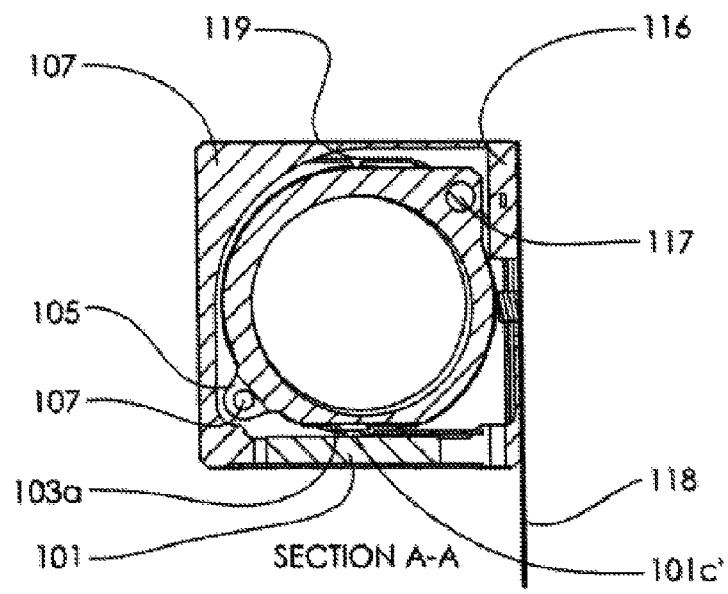
FIG. 3D is a cross sectional view A-A of the lens actuator module shown in FIG. 3C.

A frictional contact member 103a shown in FIG. 3D has a cylindrical surface with the axis of this cylindrical surface aligned substantially perpendicular to axis 108 shown in FIGS. 3A and 3B, although other surface topologies may also be used. The frictional contact member 103a is mounted to the lens carriage 105. Frictional contact member 103a is similar to the frictional contact member 103 except the axis of the cylindrical surface of the frictional contact member 103a is rotated 90 degrees. Piezo motor 101 has a contact member 101c' with a cylindrical surface with the axis of this cylindrical surface aligned substantially parallel to axis 108, although other surface topologies (e.g., spherical, as noted above) may also be used. Contact member 101c' is similar to the motor contact member 101b shown in FIG. 1A, for example, except the axis of the cylindrical surface of contact member 101c' is rotated 90 degrees. The geometrically orthogonal cylindrical surfaces of contact members 103a and 101c' touch at contact point 104. By way of example only, contact members 103a and 101c' can be of different shapes such as spherical, cylindrical, planar, convex, concave, or combinations thereof, to form contact point 104 or a contact line, depending on specific shapes of the contacting surfaces.

Referring back to FIG. 3A, piezo motor 101 is electrically connected to drive electronics (not shown) using a flexible printed circuit (FPC) 112. The FPC 112 has six pads 115 that are soldered to six corresponding electrodes 114 on piezo motor 101, although a higher or a lower number of pads and corresponding electrodes may also be used for connection, as known to those of ordinary skill in the art.

Referring to FIG. 3C, piezo motor 101 is supported by a mount plate 113 at the piezo motor 101's node points 102 (shown in FIGS. 1A and 1B). Piezo motor 101 and mount plate 113 are secured together at node points 102 using a strong and compliant adhesive, e.g., Dow Corning® 734 flowable sealant provided by Dow Corning Corporation of Midland, Mich., although other types of adhesives may also be used. Mount plate 113 is secured to housing 111 using a rigid adhesive along its top and bottom edges. The two flexure springs 119 work together to generate preload force 110 that acts on lens carriage 105 at points 119a.

Figure 3E:
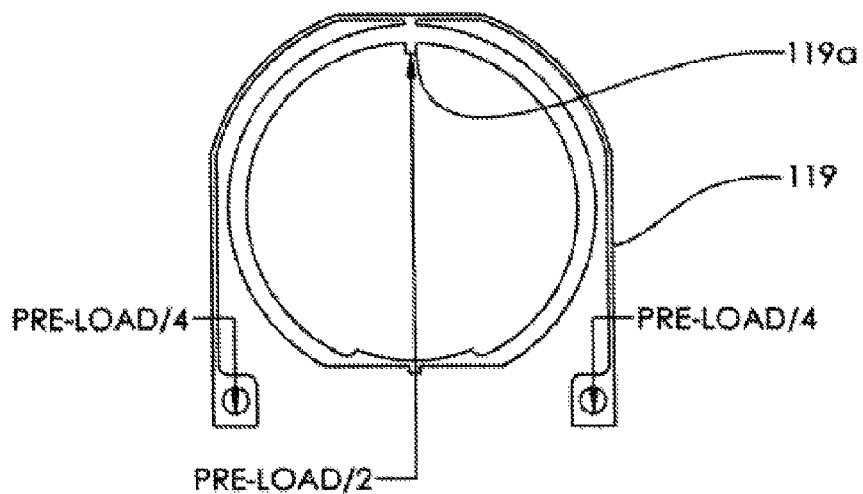
FIG. 3E is a top view of a flexure spring illustrating preload force vectors of the lens actuator module shown in FIG. 3A.

Referring now to FIG. 3E, the two forces acting on points 119a generate the total preload force 110 acting on contact point 104 shown in FIG. 3B, for example. The springs 119 are connected to housing 111 using four pins 111b, shown in FIG. 3A, although a higher or a lower number of pins may be used. Further, although a flexure spring assembly formed by springs 119 is being described herein to generate the preload force 110, other techniques of generating the preload force 110 (e.g., using an electrostatic force generator, a hydraulic force generator, a roller bearing element, and/or a ball bearing element) may also be used. Each of springs 119 contributes a value (preload force 110)/2 and each of pins 111b supports a value (preload force 110)/4. The preload force 110 is created during assembly as the springs 119 are deflected. The springs 119 are designed to generate the required preload force 110, but at the same time are substantially flexible along axes 106 and 108. High flexibility minimizes the forces generated by the springs 119 in the direction parallel to optical axis 106 which are generated as the lens carriage 105 moves through it range of motion as shown by arrows in direction 109 in FIGS. 3F and 3G.

Figure 3F:
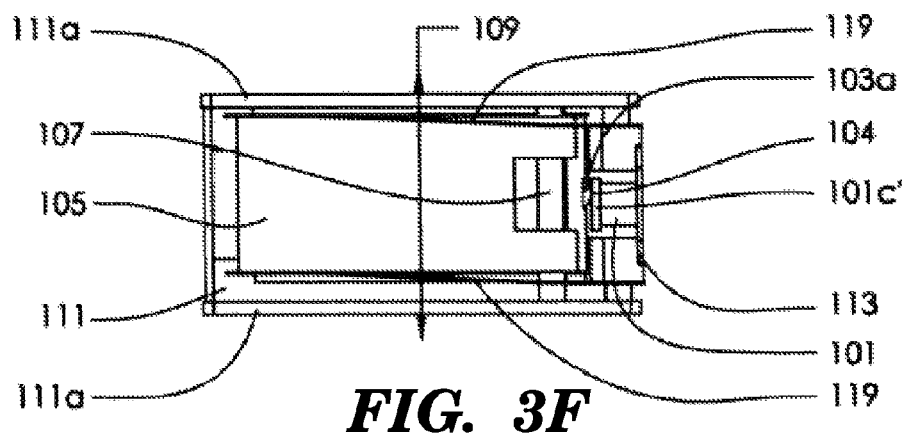
FIG. 3F is a internal side view of the lens actuator module shown in FIG. 3A illustrating a lens carriage displaced in a first position.
Figure 3G:
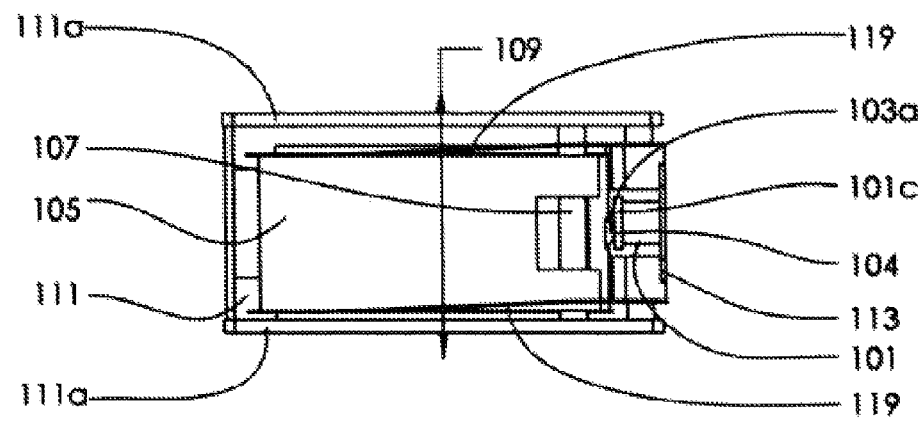
FIG. 3G is a internal side view of the lens actuator module shown in FIG. 3B illustrating the lens carriage displaced in a second position.

Referring to FIG. 3F, the lens carriage 105 is shown at its highest position where springs 119 generate a small force, at points 119a shown in FIGS. 3A, 3B, 3D and 3E, pushing lens carriage 105 down. FIG. 3G shows the lens carriage 105 at its lowest position where the springs 119 generate a small force, at points 119a shown in FIGS. 3A, 3B, 3D and 3E, pushing lens carriage 105 up. In one exemplary aspect the forces generated by the spring that push lens carriage 105 up and/or down are orthogonal to the preload force 110. These forces orthogonal to the preload force 110 tend to restore the springs 119 to their natural positions. In this exemplary aspect, the restorative forces generated by springs 119 parallel to optical axis 106 are not desirable and are minimized to less than ten percent of the preload force 110, although for other example, these forces can be less that five percent of the preload force 110. Although, the restorative forces orthogonal to the preload force 110 are being described with respect to springs 119 in FIGS. 3F and 3G, it is to be noted that these forces may also be generated using permanent magnets 219, an electrostatic generator, a hydraulic generator, a roller bearing arrangement, a ball bearing arrangement, or other restorative force generators known to those having ordinary skill in the art.

In FIGS. 3F and 3G, preload force 110 shown in FIG. 3B is generated at points 119a shown in FIGS. 3A, 3B, 3D and 3E and produces a rotation of the lens carriage 105 and frictional contact member 103a around axis 108 until the rotation is stopped by contact point 104. The preload force 110 vector at contact points 119a is parallel and in-line with an equal and opposite contact force (not shown) generated at contact point 104. Substantially, all forces and moments are cancelled at contact point 104 which minimizes the reaction forces at the pin-bushing guide and corresponding friction and also maximizes the force efficiency of the module and safety factor while minimizing the speed ratio. The preload force 110 at contact point 104 is used by the piezo motor 101 to generate the motor drive force 101c shown in FIG. 1B that moves lens carriage 105 along axes 106 and 108.

Referring back to FIG. 3A, according to another example, integrated into the lens actuator module 100 is a Hall-effect position sensor 116 which is used with magnet 117 to measure the location of lens carriage 105 along optical axis 106. By way of example only, the Hall-effect position sensor 116 can be Allegro Part Number A1395 provided by Allegro MicroSystems, Inc. of Worcester, Mass., although other manufacturers and other types of position sensors may be used including but not limited to: optical, strain, and/or capacitance type position sensors. The position sensor 116 is mounted to a flexible printed circuit board (FPC) 118 and the FPC 118 is mounted to the housing 111, which is stationary. The magnet 117 is mounted to the moving lens carriage 105. The Hall-effect position sensor 116 measures the change of magnetic field as the magnet 117 moves relative to the position sensor 116.

Figure 4A:
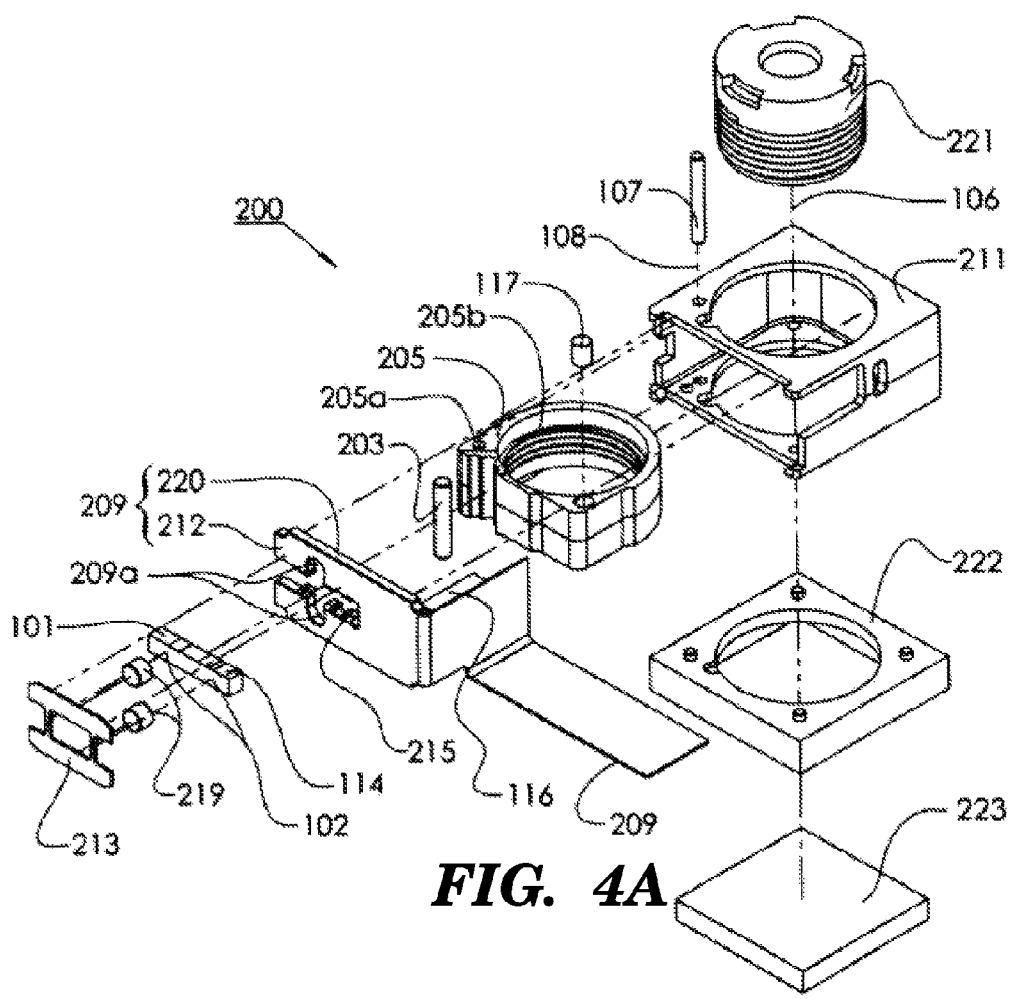
FIG. 4A is an exploded perspective view of the lens actuator module shown in FIGS. 2A and 2B.

Exemplary details of the lens actuator module 200 will now be described below with reference to FIGS. 4A-4D and FIG. 5. Referring to FIG. 4A, an exploded view of the lens actuator module 200 is shown. Lens actuator module 200 includes a module housing 211 that forms the primary external and stationary structure. Lens carriage 205 is arranged to fit inside module housing 211 and has a cylindrical threaded opening 205b that accepts a threaded lens 221 having the optical axis 106, although other types of lenses may be used. Lens carriage 205 is displaceable along axis 108 formed by guide pin 107 that has its ends fixed to module housing 211. Guide pin 107 fits inside one of carriage bushings 205a with a small clearance typically less than 5 micrometers, for example. Carriage bushings 205a are part of lens carriage 205 and together with guide pin 107 and forms a pin-bushing bearing guide (also referred to as the pin-bushing guide herein). The pin-bushing guide supports lens carriage 205 and the lens 221 and allows motion in a linear direction around axis 108 and rotation around axis 108, although motion along other directions may also be enabled. As disclosed above, according to an example, axis 108 is substantially parallel to optical axis 106. An image sensor adapter 222 locates the lens actuator module 200 relative to an image sensor 223. By way of example only, image sensor 223 can be typically a charge-coupled device (CCD) or a complementary metal-oxide-semiconductor (CMOS) active-pixel sensor, although other types of image sensors may also be used, as known to those of ordinary skill in the art. The frictional contact member 203 mounted to lens carriage 205 is made of a ferromagnetic material, and is a cylinder with its axis substantially parallel to optical axis 106, although other types of materials may also be used. Piezo motor 101 includes the motor contact member 101b with a cylindrical surface with the axis of the cylindrical surface substantially perpendicular to optical axis 106. In this example, the orthogonal cylindrical surfaces of contact members 101b and 203 touch at the contact point 104, although other shapes such as spherical, cylindrical, planar, convex, concave, or combinations thereof, to form contact point 104 or a contact line, depending on specific shapes of the contacting surfaces may also be used.

According to one example, lens actuator module 200 can be adapted for greater integration of the electronic components than lens actuator module 100. A printed circuit board (PCB) 209 incorporates both flexible and rigid elements to connect to piezo motor 101, driver integrated circuit (IC) 224 (shown in FIG. 4C) and position sensor 116 shown in FIG. 4A to external control electronics (not shown). By way of example only, piezo motor 101 is electrically connected using six flexible printed circuit board (FPC) tabs 215, shown in FIG. 4A, that are part of a larger FPC 212. Tabs 215 are pre-coated with solder and then electrically connected to the corresponding electrodes 114 shown in FIG. 4A using automated solder reflow processing, although other methods of connection well known to those of ordinary skill in the art may also be used. Tabs 215 have high flexibility and low mass which minimizes the damping of piezo motor 101 vibrations. The FPC 212 is integrated to a rigid circuit board 220 that electrically connects the driver IC 224. By keeping the driver IC 224 close to the piezo motor 101 electromagnetic interference is minimized. The FPC 212 is arranged to wrap around one or more corners of housing 211 shown in FIG. 4A and solder contacts connecting to position sensor 116. PCB 209 exits the lens actuator module 200 to connect with external control electronics (not shown).

Figure 4B:
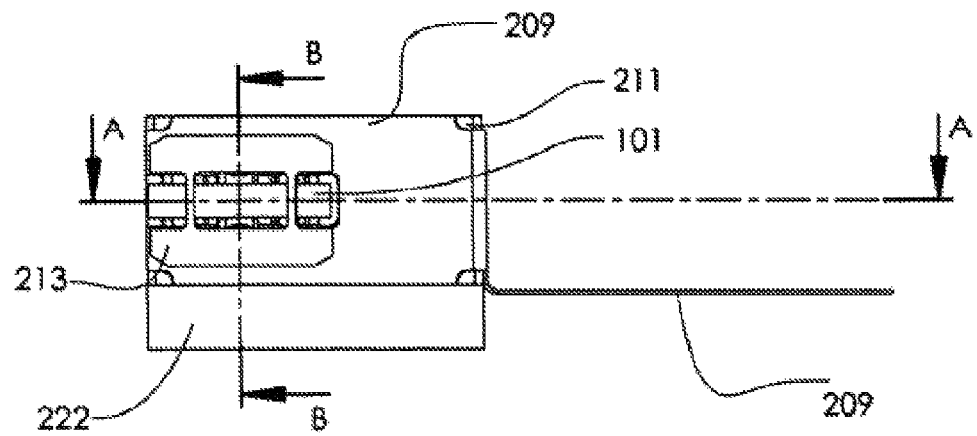
FIG. 4B is a side view of the lens actuator module shown FIG. 4A.

Referring to FIG. 4B, piezo motor 101 is supported by a mount plate 213 at the piezo motor 101 node points 102 (described above with respect to FIGS. 1A and 1B). Piezo motor 101 and mount plate 213 are secured using compliant adhesive, such as Dow Corning® 734 flowable sealant provided by Dow Corning Corporation of Midland, Mich., although other types of adhesives may also be used as known to those of ordinary skill in the art. Mount plate 213 is secured to PCB 209 using a rigid adhesive along its top and bottom edges. In addition, PCB 209 is similarly secured to module housing 211 using a rigid adhesive.

Figure 4C:
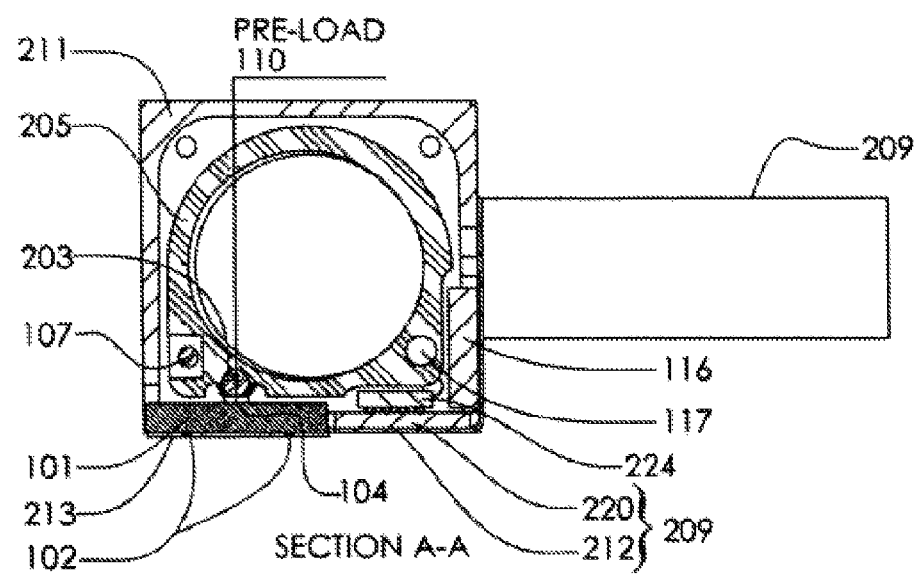
FIG. 4C is a cross sectional views A-A of the lens actuator module shown in FIG. 4B.
Figure 5:
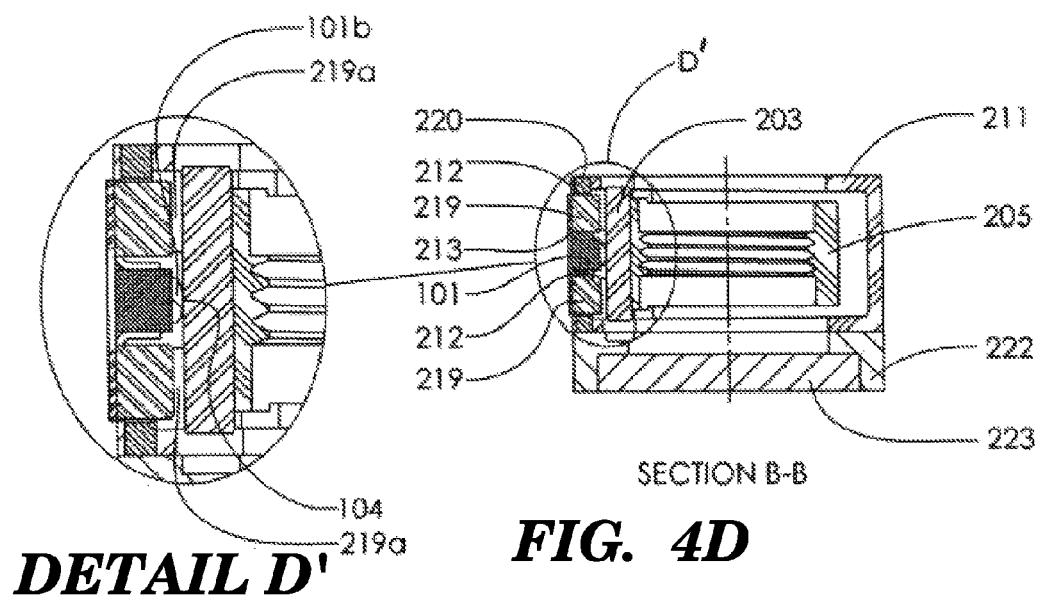
FIG. 5 is a simplified section diagram showing the operation of the preload generated in lens actuator module shown in FIG. 4A.
Figure 5:
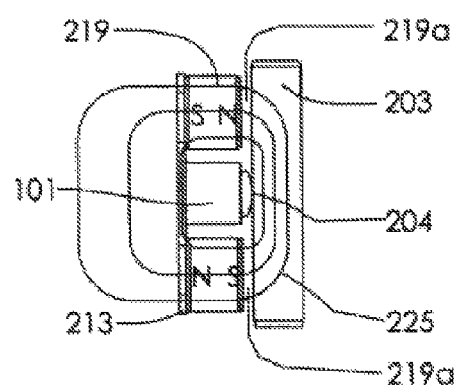

Referring now to FIG. 4C, by way of example only, the preload force 110 is generated in lens actuator module 200 using magnetic attraction without direct physical contact between the moving and stationary components. Two cylindrical stationary permanent magnets 219 shown in FIGS. 4A, 4D, and 5 are secured with adhesive to the mount plate 213 through circular openings 209a provided in the rigid circuit board 220. The centers of the two permanent magnets 219 form a substantially straight line with contact point 104 and this straight line is parallel to axis 108. The stationary permanent magnets 219 generate a magnetic attraction with ferromagnetic frictional contact member 203 through circular openings 209a to hold the frictional contact member 203 in a stable position. It is to be noted that although permanent magnets 219 have been described above, electromagnets or other shapes of permanent magnets may also be used.

Figure 7:
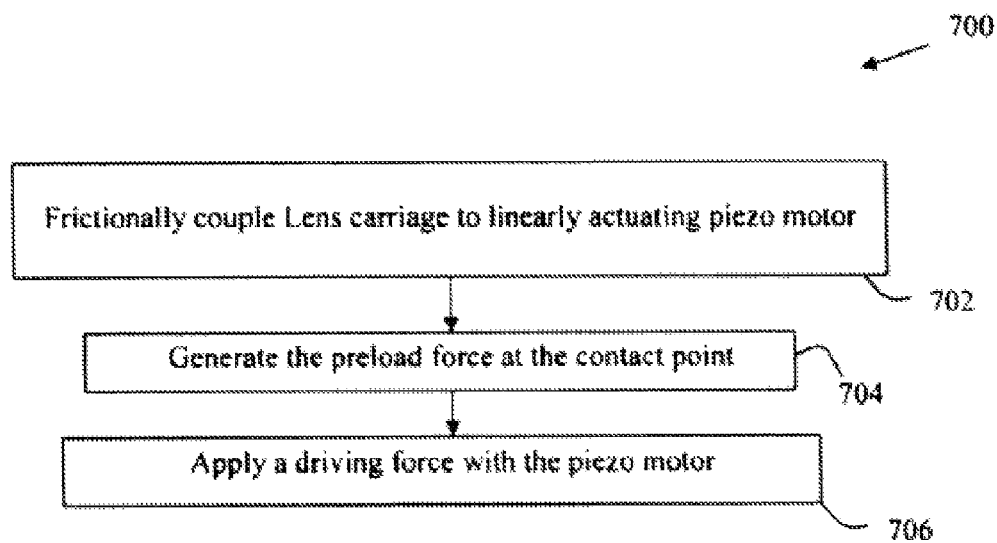
FIG. 7 is a flowchart of a method for making a lens actuator module.

Referring to FIG. 5, the permanent magnets 219 are assembled with opposite and complimentary north-south (N-S) poles so that the magnetic field strength 225 in the gaps 219a are equal, maximized, and in-line with the contact point 104. The magnetic preload force 110 shown in FIG. 4C generates a rotation of frictional contact member 203 and lens carriage 205 around axis 108 until the rotation is stopped by contact point 104. Substantially all forces and moments are cancelled at contact point 104 which minimizes the reaction forces and corresponding friction generated by the preload force 110 at the pin-bushing guide and also maximizes the force efficiency of the module. The magnetic preload force 110 is generated at contact point 104 without physical contact that results in residual forces, orthogonal to the preload direction, that are less than 5 percent of the preload value throughout the range of travel of lens carriage 205. It is to be noted that the description of position sensor 116 and magnet 117 is the same as lens actuator module 100. Further, although a magnet assembly formed by permanent magnets 219 is being described herein to generate the preload force 110, other techniques of generating the preload force 110 (e.g., using electrostatic force generator, a hydraulic force generator, springs 119, a roller bearing element, and/or a ball bearing element) may also be used Operation and a method for making lens actuator module 200 will now be described with reference to flowchart 700 in FIG. 7 with reference back to FIGS. 1A-6B. In step 702, lens carriage 205 is frictionally coupled to linearly actuating piezo motor 101 at contact point 104. The method of flowchart 700 can comprise further other steps, for example, holding lens 221 within the lens carriage 205, the lens 221 comprising an optical axis 106 and a clear aperture, and covering the lens carriage 205 with module housing 211 that supports one or more stationary components of the lens carriage 205.

In step 704, the preload force 110 is generated at the contact point 104, so that the preload force 110 is substantially constant, is oriented in-line with the contact point 104, and is perpendicular to optical axis 106, the optical axis 106 being substantially parallel to a centerline of the lens carriage. The generating can be carried out, for example, with at least one spring among springs 119 and/or permanent magnets 219 during an assembly of the lens carriage 205.

In step 706, a driving force is applied with the piezo motor 101 using the preload force 110 while maintaining the in-line orientation of the preload force 110. As noted above, piezo motor 101 can be excited using electrical connections sourced from a driver circuit, for example.

Figure 8:
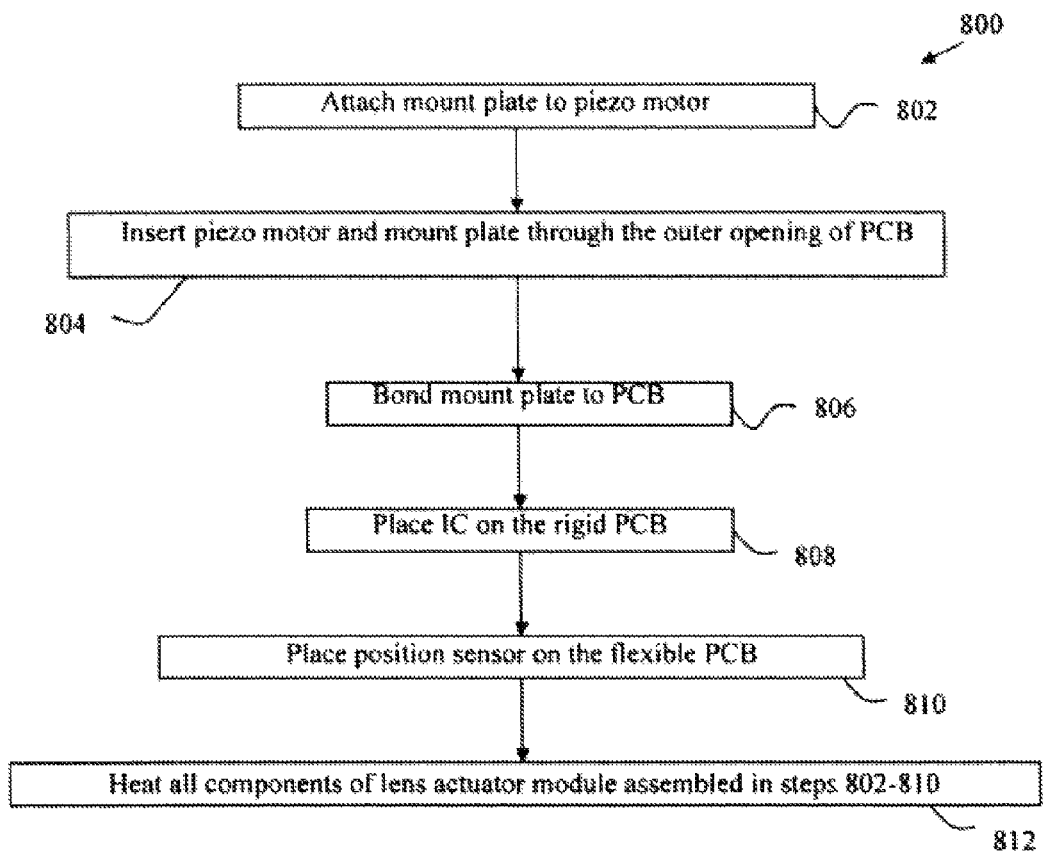
FIG. 8 is a flowchart of a method for providing a preloaded lens actuator module using automated solder reflow processing

An exemplary method for providing a preloaded lens actuator module using automated solder reflow processing is described with reference to flowchart 800 in FIG. 8 and with reference back to FIGS. 1A-6B. In step 802, mount plate 213 is attached to piezo motor 101. In step 804, piezo motor 101 and plate 213 are inserted through the outer opening of PCB 209 so that the six tabs 215 are displaced 90 degrees and simultaneously touch the top and bottom electrodes 114 on piezo motor 101. In step 806, plate 213 is bonded to PCB 209. In step 808, IC 224 is placed on the rigid circuit board 220 using a standard surface mount processes, although other mounting processes may also be used. In step 810, position sensor 116 is placed on the FPC 212 using standard surface mount processes, although other mounting processes may also be used. In step 812, all components of lens actuator module 200 assembled in steps 802-810 are heated using standard solder reflow processes to complete all electrical solder connections.

Although the steps of the flowcharts 700 and 800 have been described using lens actuator module 200, steps in flowcharts 700 and 800 are equally applicable to lens actuator module 100 or other lens actuator modules. Further, steps in flowcharts 700 and 800 can be performed in any other order suitable to carry out the exemplary aspects and the order of steps shown in flowcharts 700 and 800 is for example only and is not limiting.

Having thus described the basic concept of the invention, it will be rather apparent to those of ordinary skill in the art that the foregoing detailed disclosure is intended to be presented by way of example only, and is not limiting. Various alterations, improvements, and modifications will occur and are intended to those of ordinary skill in the art, though not expressly stated herein. These alterations, improvements, and modifications are intended to be suggested hereby, and are within the spirit and scope of the invention. For example, based upon various parameters, two or more components of the lens actuator modules 100 and 200 can be integrated, or may be made parts of an integrated circuit chip. Further, alterations in electrical and mechanical components may be realized by interchanging and/or adding electrical connections and components for mechanical connections or components and vice-versa, as and when appropriate without departing from the scope of various aspects of this invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A lens actuator module, comprising:
a linear actuator; and
a lens carriage frictionally coupled to the linear actuator at a contact point using a preload force being applied at the contact point in a direction from the lens carriage, wherein the pre-load force is substantially constant and is in-line with the contact point such that the preload force is perpendicular to an axis of a linear actuator drive force, the axis being substantially parallel to a centerline of the lens carriage, wherein the preload force is generated by at least one spring during an assembly of the lens carriage, and wherein forces orthogonal to the preload force generated by the at least one spring are less than 10 percent of the preload force irrespective of the location of the lens carriage along the centerline.

2. The lens actuator module as set forth in claim 1, wherein the forces orthogonal to the preload force are less than 5 percent of the preload force.

3. The lens actuator module as set forth in claim 1 further comprising a lens assembly within the lens carriage comprising an optical axis and a clear aperture.

4. The lens actuator module as set forth in claim 3, wherein the lens carriage comprises an integrated bearing guide adjacent to the clear aperture so that the bearing guide allows a linear and a rotational movement of the lens carriage and an axis of the bearing guide is substantially parallel to the optical centerline.

5. The lens actuator module as set forth in claim 4, wherein the bearing guide is a pin-bushing bearing guide.

6. The lens actuator module as set forth in claim 1 further comprising a housing that covers the lens carriage and supports one or more stationary components of the lens carriage.

7. The lens actuator module as set forth in claim 1, wherein the contact point is formed by a contact between a first contact member of the linear actuator and a second contact member of the lens carriage.

8. The lens actuator module as set forth in claim 1 wherein the preload force is generated by at least one of an electrostatic force generator, a hydraulic force generator, a roller bearing element, and a ball bearing element.

9. The lens actuator module as set forth in claim 1, wherein the linear actuator is an ultrasonic piezoelectric motor configured to move the contact point by generating the linear actuator drive force substantially equal to the preload force multiplied by the coefficient of friction between a surface of the linear actuator and another surface of the lens carriage.

10. The lens actuator module as set forth in claim 9, wherein the ultrasonic piezoelectric motor comprises a ceramic rectangular beam with one or more electrical contacts on two opposing surfaces, the electrical contacts made to the two opposing surfaces using a single flexible circuit board with flexible tabs that bend around opposing sides of the ceramic rectangular beam, the electrical contact being soldered using an automated solder reflow process.

11. A method of making a lens actuator module, comprising:
providing a linear actuator; and
frictionally coupling a lens carriage to the linear actuator at a contact point using a preload force being applied at the contact point in a direction from the lens carriage, wherein the preload force is substantially constant and is in-line with the contact point such that the preload force is perpendicular to an axis of a linear actuator drive force, the axis being substantially parallel to a centerline of the lens carriage wherein the preload force is generated by at least one spring during assembling of the lens carriage, and wherein forces orthogonal to the preload force generated by the at least one spring are less than 10 percent of the preload force irrespective of the location of the lens carriage along the centerline.

12. The method as set forth in claim 11, wherein the forces orthogonal to the preload force are less than 5 percent of the preload force.

13. The method as set forth in claim 11 further comprising providing a lens assembly within the lens carriage comprising an optical axis and a clear aperture.

14. The method as set forth in claim 13, wherein the providing the lens carriage comprises integrating a bearing guide adjacent to the clear aperture so that the bearing guide allows a linear and a rotational movement of the lens carriage and an axis of the bearing guide is substantially parallel to the optical centerline.

15. The method as set forth in claim 14, wherein the bearing guide is a pin-bushing bearing guide.

16. The method as set forth in claim 11 further comprising providing a housing covering the lens carriage and supporting one or more stationary components of the lens carriage.

17. The method as set forth in claim 11, wherein the frictionally coupling comprises forming the contact point by contacting a first contact member of the linear actuator and a second contact member of the lens carriage.

18. The method as set forth in claim 11 wherein the preload force is generated by at least one of an electrostatic force generator, a hydraulic force generator, a roller bearing element and a ball bearing element.

19. The method as set forth in claim 11, wherein the linear actuator is an ultrasonic piezoelectric motor configured to move the contact point by generating the linear actuator drive force substantially equal to the preload force multiplied by the coefficient of friction between a surface of the linear actuator and another surface of the lens carriage.

20. The method as set forth in claim 19, wherein the ultrasonic piezoelectric motor comprises a ceramic rectangular beam with one or more electrical contacts on two opposing surfaces, the electrical contacts made to the two opposing surfaces using a single flexible circuit board with flexible tabs that bend around opposing sides of the ceramic rectangular beam, the electrical contact being soldered using an automated solder reflow processing.

21. A lens actuator module, comprising:
a linear actuator; and
a lens carriage frictionally coupled to the linear actuator at a contact point using a preload force being applied at the contact point in a direction from the lens carriage, wherein the pre-load force is substantially constant and is in-line with the contact point such that the preload force is perpendicular to an axis of a linear actuator drive force, the axis being substantially parallel to a centerline of the lens carriage wherein the preload force is generated by a magnetic assembly, wherein forces orthogonal to the preload force generated by the magnetic assembly are less than 10 percent of the preload force irrespective of the location of the lens carriage along the centerline.

22. The lens actuator module as set forth in claim 21, wherein the forces orthogonal to the preload force are less than 5 percent of the preload force.

23. The lens actuator module as set forth in claim 21 further comprising a lens assembly within the lens carriage comprising an optical axis and a clear aperture.

24. The lens actuator module as set forth in claim 23, wherein the lens carriage comprises an integrated bearing guide adjacent to the clear aperture so that the bearing guide allows a linear and a rotational movement of the lens carriage and an axis of the bearing guide is substantially parallel to the optical centerline.

25. The lens actuator module as set forth in claim 24, wherein the bearing guide is a pin-bushing bearing guide.

26. The lens actuator module as set forth in claim 21 further comprising a housing that covers the lens carriage and supports one or more stationary components of the lens carriage.

27. The lens actuator module as set forth in claim 21, wherein the contact point is formed by a contact between a first contact member of the linear actuator and a second contact member of the lens carriage.

28. The lens actuator module as set forth in claim 21 wherein the preload force is generated by at least one of an electrostatic force generator, a hydraulic force generator, a roller bearing element, and a ball bearing element.

29. The lens actuator module as set forth in claim 21, wherein the linear actuator is an ultrasonic piezoelectric motor configured to move the contact point by generating the linear actuator drive force substantially equal to the preload force multiplied by the coefficient of friction between a surface of the linear actuator and another surface of the lens carriage.

30. The lens actuator module as set forth in claim 29, wherein the ultrasonic piezoelectric motor comprises a ceramic rectangular beam with one or more electrical contacts on two opposing surfaces, the electrical contacts made to the two opposing surfaces using a single flexible circuit board with flexible tabs that bend around opposing sides of the ceramic rectangular beam, the electrical contact being soldered using an automated solder reflow process.

31. A method of making a lens actuator module, comprising:
providing a linear actuator; and
frictionally coupling a lens carriage to the linear actuator at a contact point using a preload force being applied at the contact point in a direction from the lens carriage, wherein the preload force is substantially constant and is in-line with the contact point such that the preload force is perpendicular to an axis of a linear actuator drive force, the axis being substantially parallel to a centerline of the lens carriage wherein the preload force is generated by a magnetic assembly, and wherein forces orthogonal to the preload force generated by the magnetic assembly are less than 10 percent of the preload force irrespective of the location of the lens carriage along the centerline.

32. The method as set forth in claim 31, wherein the forces orthogonal to the preload force are less than 5 percent of the preload force.

33. The method as set forth in claim 31 further comprising providing a lens assembly within the lens carriage comprising an optical axis and a clear aperture.

34. The method as set forth in claim 33, wherein the providing the lens carriage comprises integrating a bearing guide adjacent to the clear aperture so that the bearing guide allows a linear and a rotational movement of the lens carriage and an axis of the bearing guide is substantially parallel to the optical centerline.

35. The method as set forth in claim 34, wherein the bearing guide is a pin-bushing bearing guide.

36. The method as set forth in claim 31, further comprising providing a housing covering the lens carriage and supporting one or more stationary components of the lens carriage.

37. The method as set forth in claim 31, wherein the frictionally coupling comprises forming the contact point by contacting a first contact member of the linear actuator and a second contact member of the lens carriage.

38. The method as set forth in claim 31, wherein the preload force is generated by at least one of an electrostatic force generator, a hydraulic force generator, a roller bearing element and a ball bearing element.

39. The method as set forth in claim 31, wherein the linear actuator is an ultrasonic piezoelectric motor configured to move the contact point by generating the linear actuator drive force substantially equal to the preload force multiplied by the coefficient of friction between a surface of the linear actuator and another surface of the lens carriage.

40. The method as set forth in claim 39, wherein the ultrasonic piezoelectric motor comprises a ceramic rectangular beam with one or more electrical contacts on two opposing surfaces, the electrical contacts made to the two opposing surfaces using a single flexible circuit board with flexible tabs that bend around opposing sides of the ceramic rectangular beam, the electrical contact being soldered using an automated solder reflow processing.

* * * * *